United States Patent [19]
Isozaki

[11] Patent Number: 4,724,736
[45] Date of Patent: Feb. 16, 1988

[54] KEYBOARD MUSICAL INSTRUMENTS WITH TRANSPOSITIONAL FUNCTION

[75] Inventor: Yoshimasa Isozaki, Hamamatsu, Japan

[73] Assignee: Nippon Gakki Seizo Kabushiki Kaisha, Hamamatsu, Japan

[21] Appl. No.: 895,240

[22] Filed: Aug. 11, 1986

[30] Foreign Application Priority Data

Sep. 2, 1985 [JP] Japan .................. 60-193677

[51] Int. Cl.⁴ .................. G09B 15/04; G10H 1/20
[52] U.S. Cl. .................. 84/1.01; 84/445; 84/478
[58] Field of Search .................. 84/1.01, 445, 477 R, 84/478–480

[56] References Cited

U.S. PATENT DOCUMENTS 2,933,004 4/1960 Hanert et al. .
4,176,573 12/1979 Deutsch .................. 84/1.01

FOREIGN PATENT DOCUMENTS 55-126296 9/1980 Japan .
58-84692 6/1983 Japan .

Primary Examiner—S. J. Witkowski
Attorney, Agent, or Firm—Blakely, Sokoloff, Taylor & Zafman

[57] ABSTRACT

A keyboard musical instrument with a transpositional function includes a keyboard, a mode selection switch, a microcomputer, a musical tone signal generator and a sound system. The keyboard has a plurality of keys respectively representing different notes in a musical scale. The mode selection switch selects one of a transposition mode and a play mode. The microcomputer includes a CPU, a ROM, and a RAM to detect first and second depressed keys when the transposition mode is selected by the mode selection switch. The microcomputer generates transposition data having a value corresponding to an interval between the notes represented by the first and second keys. The microcomputer generates a note signal representing a note higher or lower by the interval represented by the transposition data than a note of a given depressed key when the play mode is selected by the mode selection switch. The musical tone signal generator generates a musical tone signal in response to the note signal and the sound system sounds a musical tone corresponding to the musical tone signal, so that the musical tone is a transposed one of a tone represented by the given depressed key by the interval.

8 Claims, 5 Drawing Figures

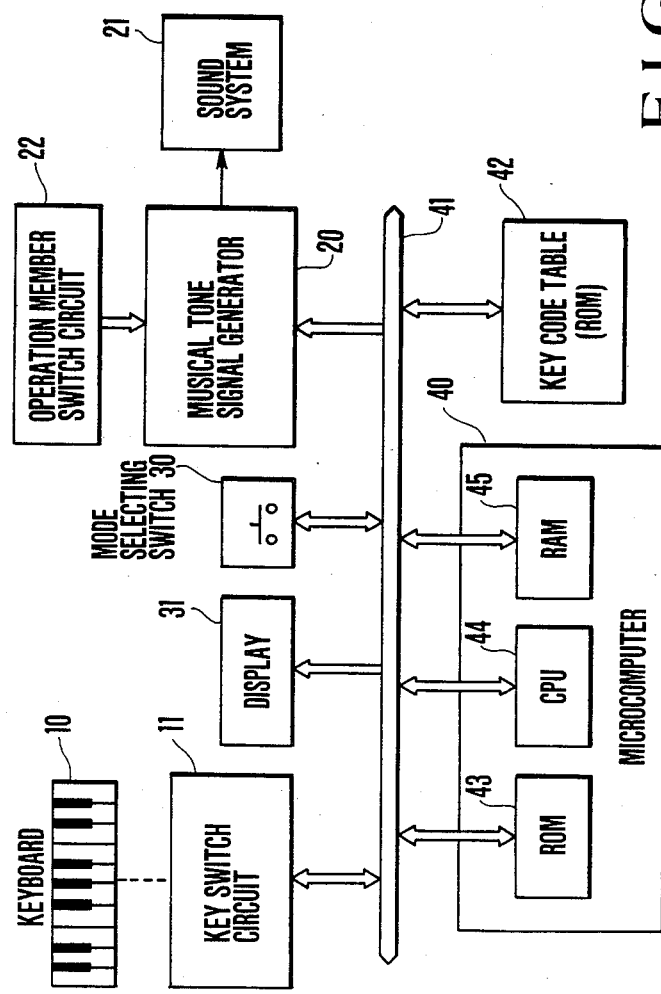

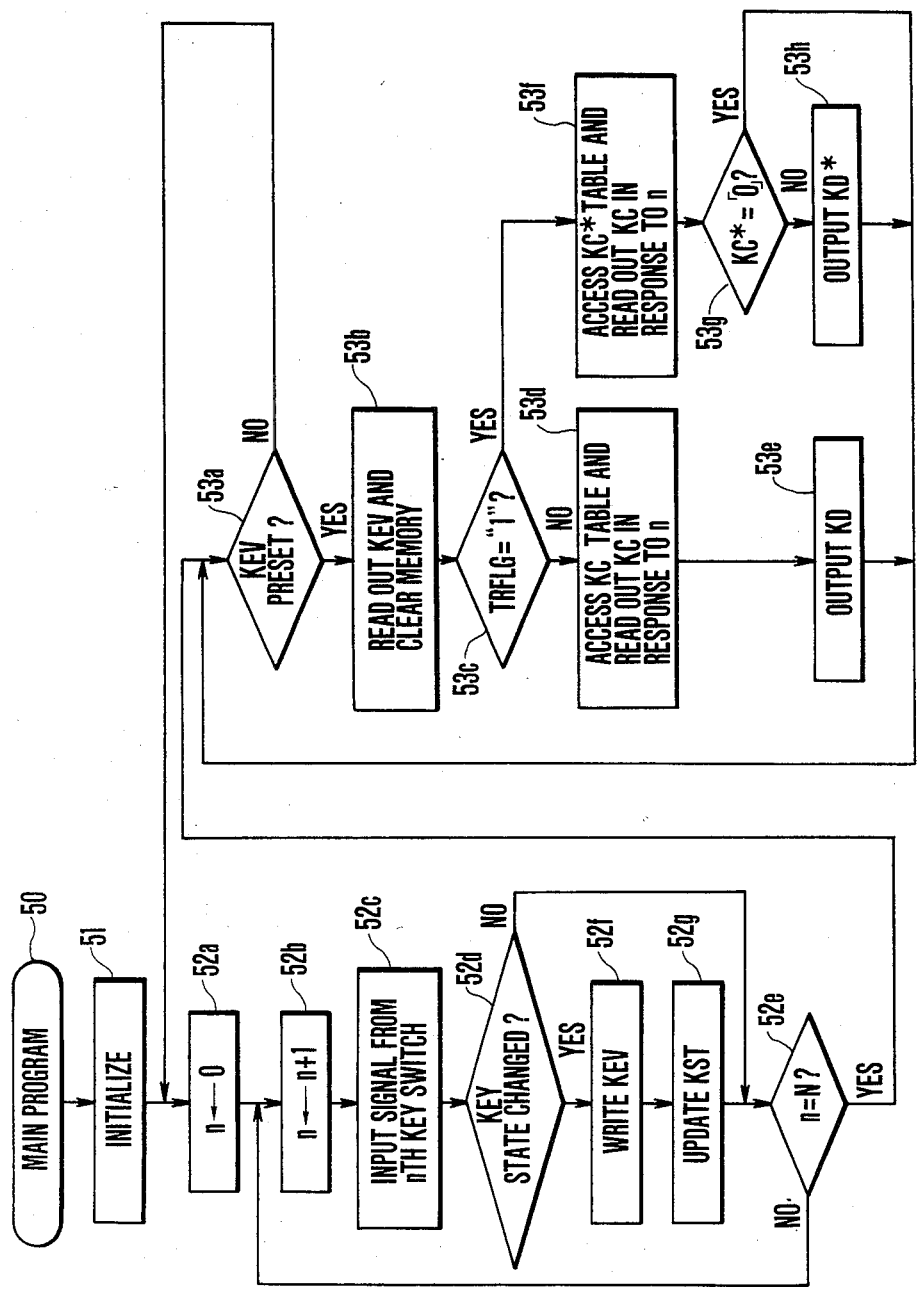

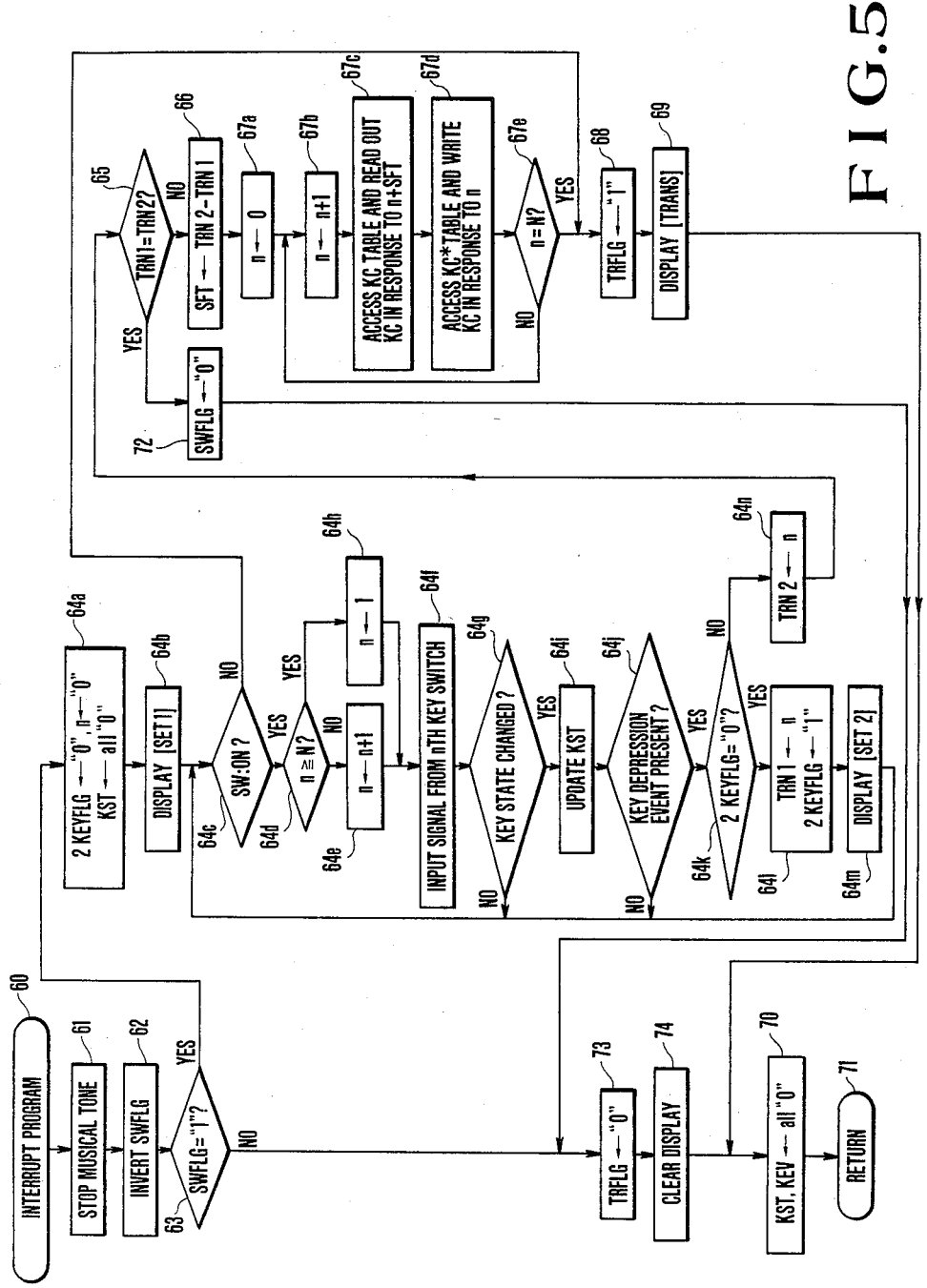

KEYBOARD MUSICAL INSTRUMENTS WITH TRANSPOSITIONAL FUNCTION

BACKGROUND OF THE INVENTION

The present invention relates to a keyboard musical instrument with a transpositional function capable of designating an interval to be transposed by utilizing keyboard's keys.

A conventional keyboard musical instrument with a transpositional function is described in Japanese Patent Prepublication No. 55-126296. This musical instrument includes a rotary switch for designating an interval to be transposed by operating a rotary switch. When a player selects a certain one among twelve notes, an encoder following the rotary switch outputs transposition data having a value corresponding to the designated interval which is the difference between the selected note and note C on a C major scale.

In the conventional keyboard musical instrument with a transpositional function described above, a 12-contact rotary switch for designation of twelve notes must be mounted on a keyboard musical instrument, resulting in a high-cost keyboard musical instrument. In addition, the 12-contact rotary switch cannot specify any interval exceeding one octave, thus limiting the interval to be transposed to 12 degrees. It would be possible to designate an interval exceeding one octave by increasing the number of contacts of the rotary switch. However, the increase in the number of contacts leads to a high fabrication cost of the rotary switches. Accordingly, in an available rotary switch, the number of contacts thereof is limited. As a result, the quantity to be transposed cannot be greatly increased.

SUMMARY OF THE INVENTION

It is, therefore, a principal object of the present invention to provide a low-cost keyboard musical instrument with a transpositional function which does not require a special switch for designating an interval to be transposed.

It is another object of the present invention to provide a keyboard musical instrument with a transpositional function which is capable of designating an interval exceeding an octave as a quantity to be transposed.

It is still another object of the present invention to provide a keyboard musical instrument with a transpositional function which is capable of easily designating a key transposed from a present key without calculating an interval therebetween.

In order to achieve the above objects of the present invention, there is provided a keyboard musical instrument with a transpositional function comprising: a keyboard having a plurality of keys respectively representing different notes in a musical scale; mode selecting means for selecting one of a plurality of modes at least including a transposition mode and a play mode; key depression detecting means for detecting first and second depressed keys when the transposition mode is selected by the mode selecting means; transposition data forming means for generating transposition data having a value corresponding to an interval between the notes represented by said first and second keys; pitch information forming means for generating a note signal representing a note higher or lower by the interval represented by the transposition data than a note of a given depressed key when the play mode is selected by the mode selecting means; and musical tone generating means for generating a musical tone corresponding to the note signal.

BRIEF DESCRIPTION OF THE DRAWINGS

FIG. 2 is a block diagram of an electronic musical instrument with a transpositional function according to an embodiment of the present invention;

FIG. 4 is a flow chart for explaining the main program executed by the microcomputer in FIG. 2; and FIG. 5 is a flow chart for explaining an interrupt program executed by the microcomputer in FIG. 2.

DESCRIPTION OF THE PREFERRED EMBODIMENT

Figure 1:
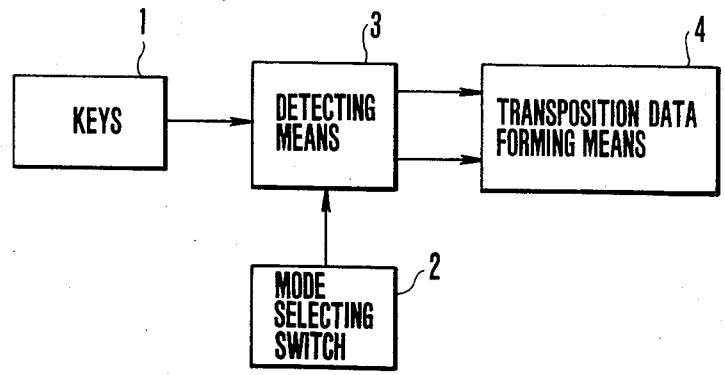
FIG. 1 is a schematic block diagram showing the principle of the present invention.

In order to best understand the present invention, its principle will be briefly described below. FIG. 1 illustrates the basic construction of a keyboard musical instrument with a transpositional function. This musical instrument has a plurality of keys on a keyboard. The musical instrument includes a mode selecting switch 2 for setting a transposition mode, a detecting means 3 for detecting first and second keys sequentially depressed in the transposition mode, and a transposition data forming means 4 for forming transposition data having a value corresponding to an interval to be transposed which is an interval between the detected first and second keys.

With this construction, a player operates the mode selecting switch 2 to set the transposition mode and thereafter sequentially depresses two keys among the keyboard's keys. These keys are detected by the detecting means 3. The transposition data is formed according to the interval between the first depressed key and second depressed key detected by the detecting means 3. In addition, the transposition data can be set up to an interval between the leftmost and rightmost keys in units of semitones, and the transposition data is set by depressing the corresponding ones of keyboard's keys to a key of music piece and a key to be transposed.

A preferred embodiment of the present invention will be described in detail hereinafter, which exemplifies a case wherein an electronic musical instrument is used as a keyboard musical instrument with a transpositional function, as shown in FIG. 2.

The electronic musical instrument comprises a keyboard 10 having a plurality of keys, a key switch circuit 11 consisting of key switches provided under the keys, the number of which is equal to that of the keys in the keyboard 10, a musical tone signal generator 20 for generating a musical tone signal, a mode selecting switch 30 as an ON/OFF type self-return switch for switching between the play mode for utilizing the keyboard 20 for musical performance and the transposition mode for utilizing the keyboard 10 for setting transposition data, a display unit 31 for displaying an operation instruction and data in the transposition mode, and a microcomputer 40 for receiving signals from the key switch circuit 11 and the mode selecting switch 30 to control the musical tone signal generator 20 and the display unit 31. The key switch circuit 11, the musical tone signal generator 20, the mode selecting switch 30, the display 31, and the microcomputer 40 are commonly connected to a bus 41. The bus 41 is also connected to a read-only memory (to be referred to as a ROM hereinafter) 42 memorizing a key code table for converting a key number n (to be described in detail later) into a key code KC. The key codes KC corresponding to the pitches of the respective keys of the keyboard 10 as well as the key codes KC corresponding to pitches whose tones fall outside the range of pitches assigned to the keys in the keyboard 10 but which can be produced by the musical tone signal generator 20 are stored at addresses accessed by key numbers n of the key code table. The musical tone signal generator 20 is controlled by the microcomputer 40 to generate a musical tone signal having a pitch corresponding to the depressed key on the keyboard 10. The musical tone signal is supplied to a sound system 21 (including an amplifier and a loudspeaker) connected to the output terminal of the generator 20. The tone color and volume level of the musical tone signal generated by the musical tone signal generator 20 are set and controlled by control signals from an operation member switch circuit 22 consisting of a plurality of operation switches connected to the musical tone signal generator 20.

Figure 3:
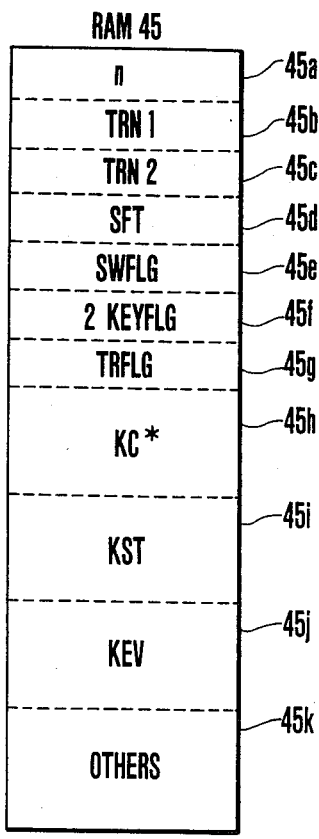
FIG. 3 is a memory map of a RAM in a microcomputer in FIG. 2.

The microcomputer 40 includes a ROM 43 for storing main and interrupt programs respectively shown in the flow charts in FIGS. 4 and 5, a CPU 44 for executing the main program upon turning on of a power switch (not shown) and the interrupt program upon operation of the mode selecting switch 30, and a random access memory (to be referred to as a RAM hereinafter) 45 having the memory map shown in FIG. 3 and consisting of registers 45a to 45k to be described below. The ROM 43, the CPU 44, and the RAM 45 are connected to the bus 41.

Register 45a: the register for storing key numbers n wherein the leftmost key in the keyboard 10 has the key number "1", the key number is increased one by one to the right, and the rightmost key has the key number "N"

Register 45b: the register for storing, as a first transposition key number TRN1, the key number n of the first depressed key in the transposition mode Register 45c: the register for storing, as a second transposition key number TRN2, the key number n of the second depressed key in the transposition mode Register 45d: the register for storing an interval SFT to be transposed Register 45e: the register for storing a switch flag SWFLG which is inverted upon every operation of the mode selecting switch 30

Register 45f: the register for storing a second depressed flag 2KEYFLG which is set at logic "0" representing the first depressed key or logic "1" representing the second depressed key in the transposition mode Register 45g: the register for storing a transposition control flag TRFLG which is set at logic "0" representing a transposition noncontrol state or logic "1" representing a transposition control state Registers 45h: the plurality of registers for storing key codes KC* transposed in units of key numbers n so as to constitute the key code table Registers 45i: the plurality of registers for storing one-bit key depression state data KST which is set at logic "0" representing the release of the depressed key or logic "1" representing depression of the key Registers 45j: the plurality of registers for storing key event data KEV upon each key depression and each key release, the event data KEV being constituted by the key number n of the newly depressed or released key and key on data KON which is set at logic "0" representing the release of the key or logic "1" representing key depression Registers 45k: the plurality of registers for storing other data OTHERS The operation of the embodiment having the arrangement described above will be described with reference to the flow charts in FIGS. 4 and 5. When the power switch is turned on, the CPU 44 starts executing the main program from step 50. In step 51, the CPU 44 supplies a clear signal to the musical tone signal generator 20 and the display unit 31 to initialize them. All bits of the respective registers 45a to 45k of the RAM 45 are set at logic "0" to initialize them.

In step 52a, the CPU 44 sets the key number n to be "0". The CPU 44 updates the key number n from "0" to "1" in step 52b. Key state data KST of the key designated by the key number n (="1") is supplied from the key switch circuit 11 to the CPU 44 in step 52c. In step 52d, the CPU 44 compares the key state data KST with the key state data KST stored in the registers 45i and corresponding to the key number n (="1") to determine whether the key state is changed. If no key operation is performed at the keyboard 10, step 52d is determined to be NO since the input key state data KST coincides with the registered key state data KST. The flow advances to step 52e. The CPU 44 determines in step 52e that the key number n (="1") is not equal to "N", and the flow returns to step 52b. Value "1" is added to the key number n in step 52b to update it to "2". Key state data KST of the key designated by the key number n (="2") is fetched from the key switch circuit 11. Since NO in steps 52d and 52e, the key number n is sequentially incremented one by one until the key number n coincides with "N". In this manner, the operations in steps 52b to 52e are repeated to continuously scan the bass keys to the treble keys in the keyboard 10. During this scanning, if the key number n reaches "N", step 52e is determined to be YES and the flow returns to step 53a. The CPU 44 determines in step 53a whether the key event data KEV is present in the registers 45j. In the cyclic operation described above, since the key event data KEV is not written in the registers 45j, step 53a is determined by the CPU 44 to be NO. That is, the CPU 44 determines that no key event data KEV is present. The flow then returns to step 52a. After the operation in step 52a is completed, the cyclic operations in steps 52b to 52e are repeated. If the key number n reaches "N", the flow again advances to step 53a. Thereafter, the cyclic operations in steps 52a to 52e and 53a are repeated until the next key in the keyboard 10 is depressed.

If the next key is depressed on the keyboard 10 and the key number n reaches a value corresponding to the depressed key during the cyclic operations in steps 52b to 52e, the CPU 44 determines step 52d to be YES, i.e., that the key state is changed. The flow then advances to step 52f. In step 52f, key event data KEV consisting of the corresponding key number n and the corresponding key on data (="1") is stored in the registers 45j. In step 52g, the key state data KST in the registers 45i at the address designated by the key number n is updated to "1" in step 52g, and the above cyclic operations continue. When another new key is depressed on the keyboard 10, key event data KEV corresponding to the depressed key is stored in the registers 45j according to the operations in steps 52f and 52g, and the depressed key state data KST in the registers 45i is set to be "1". If the key number n reaches "N" and the cyclic operations in steps 52b to 52e are completed, key event data KEV representing the newly depressed one or more keys on the keyboard 10 is stored in the registers 45j.

When the cyclic processing described above is completed, the CPU 44 determines that the key event data KEV is present, i.e., step 53a is determined to be YES. In step 53b, the CPU 44 reads out one key event data KEV from the registers 45j. At the same time, the CPU 44 erases the key event data KEV in the registers 45j. The CPU 44 determines in step 53c whether the transposition control flag TRFLG is set at logic "1". If NO in step 53c, i.e., the CPU 44 determines that the electronic musical instrument is not set in the transposition control state, the CPU 44 accesses the key code table in the ROM 42 in step 53d to read out the key code at the address designated by the key number n of the key event data KEV. Key data KD consisting of the key code KC and the key on data KON (="1") of the key event data KEV is output to the musical tone signal generator 20. In response to the key data KD, the generator 20 generates a musical tone signal having a frequency corresponding to the key code KC, and the corresponding musical tone is produced through the sound system 21. The key code KC in the ROM 42 is the one which is not processed for transposition. The pitch of the musical tone produced at the sound system 21 is the one whose pitch is the same as that of the corresponding key in the keyboard. After processing in step 53e is completed, the flow returns to step 53a. Cyclic processing in steps 53a to 53e is repeated until the key event data KEV in the registers 45j is erased. When the key data KD associated with the key event data KEV stored by the cyclic processing in steps 52b to 52e is sent to the musical tone signal generator 20 and all the key event data in the registers 45j is used and erased, step 53a is determined to be NO. Thereafter, cyclic processing in steps 52a to 52e and step 53a is performed in the same manner as described above.

Upon execution of the interrupt program (to be described later), if the transposition control flag TRFLG is set at logic "1", i.e., if the electronic musical instrument is set in the transposition control state, step 53c is determined by the CPU 44 to be YES. The CPU 44 then accesses the key code table in the registers 45h and reads out the key code KC* at an address designated by the key number n of the key event data KEV. The CPU 44 then determines in step 53g whether the key code KC* is "0". If NO in step 53g, key data KD* consisting of the key code KC* and the key on data KON (="1") of the key event data KEV is output to the musical tone signal generator 20. The flow then returns to step 53a. However, if the key code KC* is determined to be "0", i.e., if step 53g is determined to be YES, the flow returns directly to step 53a. The key code KC* of "0" signifies that the transposed key code KC* in the key code table constituted by the registers 45h exceeds a possible tone generation range of the musical tone signal generator 20. For this reason, the CPU 44 inhibits to supply the key code KC* to the musical tone signal generator 20 so as not to allow it to produce a corresponding tone. In the same manner as in the cyclic operations of steps 53a to 53e, the CPU 44 executes the cyclic operations in steps 53a to 53c and steps 53f to 53h until the key event data KEV in the registers 45j is erased. The key data KD* associated with the key event data KEV is sent to the musical tone signal generator 20 to control generation of the musical tone signal. In musical tone signal generation control, the key code KC* stored in the registers 45h is the transposed key code. The pitch of the corresponding musical tone is the one shifted by a predetermined interval downward or upward. Upon completion of the cyclic processing in steps 53a to 53c and steps 53f to 53h, the flow returns to step 52a. The cyclic operations in step 52a to 52e and step 53a then continue in the same manner as described above.

If the currently depressed key on the keyboard 10 is released, the CPU 44 determines in step 52d, during the cyclic operations in steps 52b to 52e, whether the released key state data KST (="0") read from the key switch switch 11 on the basis of the key number n in step 52c is different from the key state data KST (="1") in the registers 45i accessed by the same key number n. In this case, step 52d is determined to be YES. In other words, the CPU 44 determines that the key state is changed. In step 52f, the CPU 44 stores the key event data KEV consisting of the above key number n and the key on data KON (="0") representing the release of the key in the registers 45j. In step 52g, the key state data KST in the registers 45i designated by this key number n is set to be "0". The cyclic operations in steps 52b to 52e are executed until the key number n reaches "N". In the same manner as in the case wherein a new key is depressed, if a plurality of keys are substantially simultaneously released, a plurality of key event data KEV representing the release of the keys are stored in the registers 45j. The stored key event data KEV is converted to key data KD (or KD*) by the cyclic operations in steps 53a to 53h in the same manner as in the case of key depression. The converted signal is output to the musical tone signal generator 20. In this case, since the key on data KON in the key data KD (or KD*) is set at "0" signifying the release of the key, the tone signal generator 20 attenuates the currently generated tone signal and stops generating it. After the operations in steps 53a to 53e (or 53a to 53c, or 53f to 53h) are completed, the flow returns to step 52a. Thereafter, the cyclic operations in steps 52b to 52e and step 53a continue in the same manner as described above.

Transposition data setting in the electronic musical instrument will be described hereinafter. During the execution of the main program, when the mode selecting switch 30 is closed, the CPU 44 interrupts the execution of the main program and starts executing the interrupt program from step 60 in FIG. 5. The CPU 44 outputs a clear signal to the musical tone signal generator 20 in step 61. All musical tone signals currently produced from the generator 20 are stopped. After the operation in step 61 is completed, the CPU 44 inverts the switch flag SWFLG, which is set at logic "0" as the initial logical status. In other words, the switch flag SWFLG is set at logic "1" to set the keyboard 10 in the transposition mode. Since the switch flag of logic "1" is detected in step 63, the flow advances to step 64a. The "transposition key number setting routine" consisting of steps 64a to 64n is then executed.

In the transposition key number setting routine, in step 64a, the CPU 44 sets the second depressed key flag 2KEYFLG, the key number n and the all key state data KST to be "0" so that the registers 45f, 45a and 45i are initialized. The CPU 44 outputs a display control signal to a display unit 31 in step 64b to cause the display unit 31 to display "SET1". The display content "SET1" on the display unit 31 signifies that the player should depress a desired key on the keyboard 10 so as to set the first transposition key number TRN1. After this display control is completed, the CPU 44 reads the state of the mode selecting switch 30 to determine whether the mode selecting switch 30 is open or closed. In this embodiment, since the transposition control data is set such that the player depresses a key in the keyboard 10 while the mode selecting switch 30 is kept closed, the mode selecting switch 30 is kept closed. Step 64c is determined by the CPU 44 to be YES. The CPU 44 determines in step 64d whether the key number n (="0") exceeds "N". Since NO in step 64d, the key number n (="0") is updated to "1" in step 64e. The CPU 44 fetches the key state data KST represented by the key number n (="1") from the key switch circuit 11 in step 64f and compares it with the key state data KST at the address of the registers 45i designated by the key number n (="1"). The CPU 44 then checks whether the key state is changed. If no key depression is performed, step 64g is determined to be NO, since the input key state data KST (="0") coincides with the stored key state data KST. The flow returns to step 64c, and step 64c is determined to be YES. Step 64d is then determined by the CPU 44 to be NO. In other words, the key number n (="1") is determined not to exceed "N". The key number n is updated to "2" in step 64e. The operations in steps 64f and 64g are performed. In this manner, when no keys in the keyboard 10 are depressed, the CPU 44 sequentially increments the key number n one by one in step 64e. The cyclic operations in steps 64c to 64g are repeated since step 64g is determined to be NO. The keys are scanned from the bass keys to the treble keys in the keyboard 10. If the key number n reaches "N", step 64d is determined to be YES. In other words, the key number n is determined to exceed "N". Therefore, the key number n is reset to "1", and the cyclic operations in steps 64c to 64g continue.

Upon depression of a new key in the keyboard 10, if the key number n reaches a value corresponding to the depressed key during the cyclic operations in steps 64c to 64g, step 64g is determined by the CPU 44 to be YES. In other words, the CPU 44 determines that a key state is changed. The key state data KST in the registers 45i at an address accessed by the key number n is updated to "1" in step 64i. In step 64j, the CPU 44 determines that the change in key state is based on depression of the new key. The CPU 44 then determines in step 64k whether the second depressed key flag 2KEYFLG is set at logic "0". Since the second depressed key flag 2KEYFLG is set at logic "0" in step 64a, step 64k is determined by the CPU 44 to be YES. In step 64 , the CPU 44 sets the first transposition key number TRNI as the key number n and the second depressed key flag 2KEYFLG to be logic "1". The CPU 44 outputs a display control signal to the display unit 31 in step 64m to cause the display unit 31 to display "SET2". The flow then returns to step 64c. The operation in step 64 signifies that the first transposition key number TRN1 is set as the first depressed key number n in the transposition mode. The CPU 44 further sets the second depressed key flag 2KEYFLG to be logic "1" in step 64 and controls the display in step 64m. The microcomputer 40 is thus set in the wait mode for receiving the second transposition key number TRN2.

In this wait mode, the CPU 44 repeats the cyclic operations in steps 64c to 64g. If the key number n exceeds "N" during the cyclic processing, the key number n is updated to "1" in step 64h. The cyclic operations in steps 64c to 64g continue to scan the bass keys to the treble keys in the keyboard 10. Assume that the depressed key is released during the cyclic operations. In this case, if the key number n reaches the value corresponding to the released key, the CPU 44 determines that the key state is changed, i.e., YES in step 64g. The CPU 44 sets the key state data KST in the registers 45i at the address designated by the key number n to be "0" signifying the release of the key in step 64i. The CPU determines in step 64j that the change in key state is not caused by the key depression since NO in step 64i. The flow then returns to step 64c. The cyclic operations in steps 64c to 64g are performed to repeatedly scan the keyboard 10.

Upon depression of a new key during the cyclic operations in steps 64c to 64g, the CPU 44 performs the same operations in steps 64i to 64j as described above. The CPU 44 then determines in step 64k whether the second depressed key flag 2KEYFLG is set at logic "0". In this case, since the second depressed key flag 2KEYFLG is set at logic "1" in step 64 , step 64k is determined to be NO. The CPU 44 then sets the second transposition key number TRN 2 as the key number n of the depressed key. If a new key is depressed before the depressed key is depressed, processing associated with the release of the key is performed in step 64i. In this case, the operation in step 64n is performed through the operations in steps 64g to 64k, and the second transposition key number TRN2 is updated to the key number n of the newly depressed key. In this manner, the second transposition key number TRN2 is updated to the key number n of the second depressed key in the transposition mode in step 64n.

The CPU 44 determines a coincidence between the first transposition key number TRN1 and the second transposition key number TRN2 in step 65. If the first depressed key is different from the second depressed key in the transposition mode, step 65 is determined to be NO by the CPU 44, and the interval SFT to be transposed is set to be TRN2−TRN1 according to a calculation SFT=TRN2−TRN1. The interval SFT to be transposed is an interval between the first and second depressed keys in the transposition mode, in accordance with to the result of NO in step 65 and the calculation in step 66. If the second depressed key is a treble key with respect to the first depressed key, the interval SFT to be transposed is a positive value to shift the pitch to that of a treble. However, if the second depressed key is a bass key with respect to the first depressed key, the interval SFT to be transposed is a negative value to shift the pitch to that of a bass.

After the interval SFT to be transposed is set as described above, the CPU 44 executes the transposition key code table formation routine constituted by steps 67a to 67e. In this routine, the CPU 44 sets the key number n to be "0" in step 67a. The key number n (="0") is updated to "2" in step 67b. In step 67c, the CPU 44 reads out the key code KC stored at an address accessed by a value n+SFT obtained by adding the key number n ("1") in the ROM 42 to the interval SFT to be transposed. The read out code KC is stored as a transposition key code KC* at an address accessed by the key number n (="1") in the registers 45h. Since the CPU 44 then determines in step 67e that the key number n (="1") is not equal to "N", i.e., NO in step 67e, the flow returns to step 67b. The key number n (="1") is updated to "2", and the operations in steps 67c and 67d are repeated, as described above. The cyclic operations in steps 67b to 67e continue until the key number n reaches "N". The transposition key code KC* of each key which is stored in the registers 45h represents a musical tone shifted upward or downward by the interval SFT to be transposed from the corresponding key code KC stored in the ROM 42. As a result of calculations of the key number n and the interval SFT to be transposed in step 67c, if the value n+SFT represents an address at which the key code KC in the ROM 42 is not stored, i.e., if the tone pitch exceeds the possible range of pitches of tones to be generated by the musical tone signal generator 20, the transposition key code KC* stored at the address designated by the key number n in the registers 45h is reset to "0". Generation of the musical tone is inhibited by the operation in step 53g in the main program, as previously mentioned.

After the transposition key code table formation routine is completed, the CPU 44 sets the transposition control flag TRFLG to be logic "1" in step 68. The CPU 44 then outputs a display control signal to the display unit 31 in step 69 to cause the unit 31 to display "TRANS". The CPU 44 sets the key state data KST and the key event data KEV to be all "0"s to initialize the registers 45i and 45j in step 70. The main program is then executed in step 71. The operation in step 68 sets the electronic musical instrument in the transposition control state, and its state is displayed in step 69.

If the first and second depressed keys are the same in the transposition mode, comparison control in step 65 determines a coincidence between the first and second transposition key numbers TRN1 and TRN2, i.e., YES in step 65. In step 72, the CPU 44 sets the switch flag SWFLG to be logic "0". In step 73, the CPU 44 then sets the transposition control flag TRFLG to be logic "0". In step 74, the CPU 44 outputs a clear signal to the display unit 31 so as to disable the unit 31. The operations in steps 70 and 71 are then performed as described above, and the flow returns to the main program. In the operations in step 65 and steps 72 to 74, when the first and second depressed keys are the same in the transposition mode, transposition control for the electronic musical instrument is cancelled.

Under the conditions that both the switch and transposition control flags SWFLG and TRFLG are set at logic "1" and that the electronic musical instrument is set in the transposition control state, if the mode selecting switch 30 is closed, the main program is interrupted in the same manner as described above. The CPU 44 starts executing the interrupt program from step 60. After the operations in steps 61 and 62 are completed, the CPU 44 determines in step 63 that the switch flag SWFLG is not set at logic "1", i.e., NO in step 63. The operations in steps 73, 74, 70, and 71 are then executed, and the flow returns to the main program. The electronic musical instrument in the transposition control state can be cancelled upon operation of the mode selecting switch 30.

If the mode selecting switch 30 is turned off before a key is depressed twice in the transposition mode, step 63c is determined to be NO by the CPU 44. The CPU 44 maintains the transposition control state of the electronic musical instrument in steps 68 to 71. At the same time, the interval SFT to be transposed, the switch flag SWFLG, the transposition key code KC*, and the like are kept unchanged, and the flow returns to the main program. Even if the mode selecting switch 30 is turned off during setting of the transposition data, the program does not overrun. When the mode selecting switch 30 is turned on again after the mode selecting switch 30 is turned on to cancel the transposition control state of the electronic musical instrument and the mode selecting switch 30 is turned off without depressing any key, the transposition control flag TRFLG is set at logic "1", and the transposition data such as the interval SFT to be transposed and transposition key code KC* is kept to be the values prior to cancelling of the transposition control state. The transfer control and noncontrol states can be alternately changed by the mode selecting switch 30.

As is apparent from the embodiment described above, a mode selecting switch 30 is arranged on the keyboard musical instrument. The first and second keys are depressed while the mode selecting switch 30 is kept closed. Under this state, the interval SFT to be transposed can be set according to the "transposition key number setting routine" in steps 64a to 64n and arithmetic processing in step 66. The desired interval to be transposed can be easily and freely selected by arranging an inexpensive electric component in the electronic musical instrument. In addition, the transposition key code table is constituted by the registers 45h in advance according to the "transposition key code table formation routine" in steps 67a to 67e. When a player actually depresses keys in a play mode, the key number n of the depressed key is converted to the corresponding transposition key code KC* by retrieving the table. The processing time can thus be shortened as compared with the system wherein the key number n and the interval SFT to be transposed are calculated for each key depression (or key release) to obtain the corresponding transposition key code KC*, thereby improving performance efficiency. By depressing a single key twice or turning on the mode selecting switch 30 again in the transposition mode, the transposition control state can be cancelled by the operations in steps 65, 72 to 74 or steps 62, 63, 73, and 74. Therefore, the transposition control and noncontrol states can be alternately selected by simple manipulation, without increasing the number of components.

The same effect as in the above embodiment can be obtained by the following modifications.

(1) In the above embodiment, in order to increase the conversion speed required for converting the key number n of the depressed key into the corresponding transposition key code KC*, the "transposition key code table formation routine" is executed in the transposition mode to prepare the key code KC* transposed as the transposition data. However, if the key code conversion speed is of no significance in transposition control, the interval SFT to be transposed may be used as the transposition data. The transposition key code KC* may be formed for every key depression or key release in the play mode and the registers 45h for storing the transposition key codes KC* may be omitted. In this case, in step 53f in FIG. 4, the interval SFT to be transposed is added to the key number n, and the key code KC at the address accessed by the sum n+SFT is read out as the transposition key code KC* from the ROM 42. In addition, the register 45d for storing the interval SFT to be transposed may also be omitted, and the first and second transpositibn key numbers TRN1 and TRN2 may serve as transposition data. In this case, the electronic musical instrument may calculate the interval SFT to be transposed according to the first and second transposition key numbers TRN1 and TRN2 for every key depression or key release.

(2) In the above embodiment, an interval from the first depressed key to the second depressed key is defined as the interval SFT to be transposed. However, an interval from the second depressed key to the first depressed key may be defined as the interval SFT to be transposed. In this case, the first transposition key number TRN1 is subtracted from second transposition key number TRN2 to obtain the interval SFT to be transposed. The sign of the interval SFT to be transposed is reversed and the direction is shifting is accordingly reversed.

(3) In the above embodiment, the mode selecting switch 30 is turned on to cancel the transposition control state of the electronic musical instrument. However, the transposition control state of the electronic musical instrument may be cancelled by continuously depressing a single key in the transposition mode. In this case, the register 45e for storing switch flag SWFLG and steps 62, 63 and 72 in the interrupt program in FIG. 5 are omitted. Alternatively, a separate cancel switch different from the mode selecting switch 30 may be arranged to cancel the transposition control state. In this case, the mode selecting switch 30 may serve to select only the mode for setting the interval to be transplsed. The separate switch may serve to select the transposition control or noncontrol state in the play mode. In this case, steps 62, 63, 68, 9, 72, 73, and 74 are omitted. Another interrupt program is executed every time the separate switch is turned on. In this program, steps 68 and 69 and steps 73 and 74 in FIG. 5 may be alternately performed. In the above embodiment, the interval SFT to be transposed is set by depressing the first and second keys while the mode selecting switch 30 is turned on. The first and second keys may alternatively be depressed after the mode selecting switch 30 is turned off so that the interval SFT to be transposed is set. In this case, step 64c may be omitted. Instead, a timer may be started in the transposition mode. If the first and second keys are not depressed after the lapse of a predetermined period of time, the interrupt program may be interrupted and the flow may return to the main program. However, if the first and second keys are depressed within the predetermined period of time, the same processing as in the above embodiment is performed.

(4) In the above embodiment, when the transposition control flag TRFLG is set at logic "1" and the electronic musical instrument is set in the transposition control state, the display unit 31 displays "TRANS". However, the interval SFT to be transposed may be displayed on the display unit 31. In this case, the direction of interval SFT to be transposed may also be displayed as a positive or negative sign.

(5) In the electronic musical instrument of the above embodiment, the key number n is converted to the key code KC or the transposition key code KC*, and the coverted code is output to the musical tone signal generator 20. If the musical tone signal generator 20 generates a musical tone signal on the basis of the key number n since the key code KC or the transposition key code KC* is defined in association with the musical tone signal generator 20, the ROM 42 for storing the key code KC and the registers 45h for storing the transposition key code KC* may be omitted. In this case, when the electronic musical instrument is held in the transposition noncontrol state, the key number n may be output to the musical tone signal generator 20 without modifications upon detection of key depression or release. However, when the electronic musical instrument is held in the transposition control state, the value n+SFT as the sum of the key number n detected upon key depression or release and the interval SFT to be transposed may be output to the musical tone signal generator 20.

(6) In the electronic musical instrument of the above embodiment, the operation member switch circuit 22 is directly connected to the musical tone signal generator 20 to control tone colors and volume levels of the musical tone signals generated by the generator 20. However, the operation member switch circuit 22 may be connected to the bus 41, and the microcomputer 40 may detect the states of the switches in the operation member switch circuit 22. In this case, the operation member data representing the detected states of the switches may be output to the musical tone signal generator 20, thereby controlling the tone color and the volume level of the musical tone signal.

(7) In the electronic musical instrument of the above embodiment, the CPU 44 detects the key state changes in the keyboard 10 and outputs the key data KD (or KD*) associated with key depression or release to the musical tone signal generator 20 only when a key state is changed. However, if the CPU 44 detects the states of the keys in the keyboard 10 and then a depressed key, the key data representing the depressed key may be repeatedly output to the musical tone signal generator 20 while the key is being depressed. In addition, if the number of polyphonic channels in the musical tone signal generator 20 is smaller than the number of keys in the keyboard 10, known musical tone generation channel allocation may be performed prior to the output of the key data KD (or KD*) to the musical tone signal generator 20. The allocated key data KD (or KD*) may be output to the musical tone signal generator 20.

(8) In the above embodiment, the transposition data is set and the musical tone signal is generated using the microcomputer. However, hardware logic circuits such as registers, comparators, arithmetic circuits, counters, and logic gates may be used to perform the same operation as in the above embodiment.

The keyboard musical instrument with a transpositional function according to the present invention is also applicable to the following keyboard musical instrument in addition to the electronic keyboard musical instrument described above.

(1) In the above embodiment, the present invention is applied to the electronic musical instrument with the microcomputer. However, the present invention may also be applied to an electronic musical instrument constituted by a hardware logic circuit described in Japanese Patent Prepublication No. 55-126296. In this case, the keyboard musical instrument with a transpositional function is arranged in a transposition key code converter 15 in FIG. 1 or 3 of the prepublication described above. The interval SFT to be transposed in the apparatus of the embodiment described above may be used in place of transposition selection data TC1 to transposition selection data TC4.

(2) The present invention may also be applied to a piano with an automatic playing unit described in Japanese Utility Model Prepublication No. 58-84692. In this case, a transposition designation section 9 in FIG. 2 of this prepublication may be replaced with the keyboard musical instrument with a transpositional function of this embodiment. The interval SFT to be transposed in the embodiment is output to convert the automatic play key code from a floppy disk drive 18 into the transposed key address signal, thereby driving a solenoid driver 11.

(3) The present invention may also be applied to a keyboard musical instrument as a combination of a piano and an electronic musical instrument, as described in U.S. Pat. No. 2,933,004. In this case, the keyboard musical instrument with a transpositional function of the present invention is arranged in the keyboard musical instrument. Transposition data is formed upon operation of the keyboard and is used to control the pitch of the electronic musical tone generated by an electronic musical instrument section and to control a solenoid for driving the keys as described in the application example (2).

(4) The present invention may also be applied to a component type musical instrument system. A keyboard section and a musical tone generation section for generating a musical tone are structurally separated. The key data from the keyboard section is transferred to the musical tone generation section. Alternatively, the key data is temporarily stored in a memory, and is then transferred from the memory to the musical tone generation section.

What is claimed is:

1. A keyboard musical instrument with a transpositional function comprising:
   a keyboard having a plurality of keys respectively representing different notes in a musical scale;
   mode selecting means for selecting one of a plurality of modes at least including a transposition mode and a play mode;
   key depression detection means for detecting first and second depressed keys when said transposition mode is selected by said mode selecting means;
   a means for forming transposition data such that when said transposition mode is selected and said first and second keys are depressed, said transposition data is generated having a value corresponding to an interval between the notes represented by said first and second keys;
   a means for forming pitch information such that when said play mode is selected and a given key representing a first note is depressed, said transposition data is employed to generate a note signal representing a second note, said second note being higher or lower than said first note by an amount equal to said interval represented by said transposition data; and
   musical tone generating means for generating a musical tone corresponding to said note signal when said play mode is selected and said given key is depressed.

2. A keyboard musical instrument with a transpositional function according to claim 1, further comprising a display unit for displaying a manipulation for a performer to do when said transposition mode is selected.

3. A keyboard musical instrument with a transpositional function according to claim 2, further comprising initial state setting means for setting said display unit in a predetermined state when a power switch of said musical instrument is turned on.

4. A keyboard musical instrument with a transpositional function according to claim 1, further comprising a display unit for displaying said transposition data when said transposition mode is selected.

5. A keyboard musical instrument with a transpositional function according to claim 4, further comprising initial state setting means for setting said display unit in a predetermined state when a power switch of said musical instrument is turned on.

6. A keyboard musical instrument with a transpositional function according to claim 1, further comprising a mode display unit for displaying a mode selected currently among said plurality of modes.

7. A keyboard musical instrument with a transpositional function according to claim 1, further comprising initial state setting means for setting said transposition data forming means in a predetermined state when a power switch is turned on.

8. A keyboard musical instrument with a transpositional function according to claim 1, wherein said plurality of modes comprises only said transposition mode and said play mode, and said mode selecting means comprises an ON/OFF type self-return switch for alternately selecting said transposition and play modes.

* * * * *

UNITED STATES PATENT AND TRADEMARK OFFICE
CERTIFICATE OF CORRECTION

PATENT NO. : 4,724,736

DATED : 2/16/88

INVENTOR(S) : ISOZAKI

It is certified that error appears in the above-identified patent and that said Letters Patent is hereby corrected as shown below:

| COLUMN | LINE | DESCRIPTION |
|---|---|---|
| 3 | 4  | delete "n" insert --$\underline{n}$-- |
| 3 | 11 | delete "n" insert --$\underline{n}$-- |
| 3 | 35 | delete "n" insert --$\underline{n}$-- |
| 3 | 41 | delete "n" insert --$\underline{n}$-- |
| 3 | 44 | delete "n" insert --$\underline{n}$-- |
| 4 | 60 | delete "n" insert --$\underline{n}$-- |
| 4 | 1  | delete "n" insert --$\underline{n}$-- |
| 4 | 16 | delete "n" insert --$\underline{n}$-- |
| 4 | 17 | delete "n" insert --$\underline{n}$-- |
| 4 | 19 | delete "n" insert --$\underline{n}$-- |
| 4 | 23 | delete "n" insert --$\underline{n}$-- |

UNITED STATES PATENT AND TRADEMARK OFFICE
CERTIFICATE OF CORRECTION

PATENT NO. : 4,724,736

DATED : 2/16/88

INVENTOR(S) : ISOZAKI

It is certified that error appears in the above-identified patent and that said Letters Patent is hereby corrected as shown below:

| COLUMN | LINE | DESCRIPTION |
|---|---|---|
| 4 | 29 | delete "n" insert --$\underline{n}$-- |
| 4 | 31 | delete "n" insert --$\underline{n}$-- |
| 4 | 33 | delete "n" insert --$\underline{n}$-- |
| 4 | 35 | delete "n" insert --$\underline{n}$-- |
| 4 | 36 | delete "n" insert --$\underline{n}$-- |
| 4 | 39 | delete "n" insert --$\underline{n}$-- |
| 4 | 50 | delete "n" insert --$\underline{n}$-- |
| 4 | 55 | delete "n" insert --$\underline{n}$-- |
| 4 | 60 | delete "n" insert --$\underline{n}$-- |
| 4 | 63 | delete "n" insert --$\underline{n}$-- |
| 5 | 2 | delete "n" insert --$\underline{n}$-- |
| 5 | 18 | delete "n" insert --$\underline{n}$-- |

UNITED STATES PATENT AND TRADEMARK OFFICE
CERTIFICATE OF CORRECTION

PATENT NO. : 4,724,736

DATED : 2/16/88

INVENTOR(S) : ISOZAKI

It is certified that error appears in the above-identified patent and that said Letters Patent is hereby corrected as shown below:

| COLUMN | LINE | DESCRIPTION |
|---|---|---|
| 5 | 48 | delete "n" insert --$\underline{n}$-- |
| 6 | 14 | delete "n" insert --$\underline{n}$-- |
| 6 | 16 | delete "n" insert --$\underline{n}$-- |
| 6 | 20 | delete "n" insert --$\underline{n}$-- |
| 6 | 24 | delete "n" insert --$\underline{n}$-- |
| 6 | 25 | delete "n" insert --$\underline{n}$-- |
| 6 | 62 | delete "n" insert --$\underline{n}$-- |
| 7 | 10 | delete "n" insert --$\underline{n}$-- |
| 7 | 11 | delete "n" insert --$\underline{n}$-- |
| 7 | 14 | delete "n" insert --$\underline{n}$-- |
| 7 | 24 | delete "n" insert --$\underline{n}$-- |

UNITED STATES PATENT AND TRADEMARK OFFICE
CERTIFICATE OF CORRECTION

PATENT NO. : 4,724,736

DATED : 2/16/88

INVENTOR(S) : ISOZAKI

It is certified that error appears in the above-identified patent and that said Letters Patent is hereby corrected as shown below:

| COLUMN | LINE | DESCRIPTION |
|---|---|---|
| 7 | 25 | delete "n" insert --$\underline{n}$-- |
| 7 | 28 | delete "n" insert --$\underline{n}$-- |
| 7 | 32 | delete "n" insert --$\underline{n}$-- |
| 7 | 34 | delete "n" insert --$\underline{n}$-- |
| 7 | 35 | delete "n" insert --$\underline{n}$-- |
| 7 | 38 | delete "n" insert --$\underline{n}$-- |
| 7 | 43 | delete "n" insert --$\underline{n}$-- |
| 7 | 52 | delete "n" insert --$\underline{n}$-- |
| 7 | 58 | delete "n" insert --$\underline{n}$-- |
| 7 | 65 | delete "n" insert --$\underline{n}$-- |
| 7 | 67 | delete "n" insert --$\underline{n}$-- |
| 8 | 03 | delete "n" insert --$\underline{n}$-- |

UNITED STATES PATENT AND TRADEMARK OFFICE
CERTIFICATE OF CORRECTION

PATENT NO. : 4,724,736

DATED : 2/16/88

INVENTOR(S) : ISOZAKI

It is certified that error appears in the above-identified patent and that said Letters Patent is hereby corrected as shown below:

| COLUMN | LINE | DESCRIPTION |
|--------|------|-------------|
| 08 | 07 | delete "n" insert --$\underline{n}$-- |
| 10 | 26 | delete "n" insert --$\underline{n}$-- |
| 10 | 46 | delete "n" insert --$\underline{n}$-- |
| 10 | 58 | delete "n" insert --$\underline{n}$-- |
| 11 | 54 | delete "n" insert --$\underline{n}$-- |
| 11 | 60 | delete "n" insert --$\underline{n}$-- |
| 11 | 66 | delete "n" insert --$\underline{n}$-- |
| 12 | 03 | delete "n" insert --$\underline{n}$-- |

Signed and Sealed this

Twenty-third Day of August, 1988

Attest:

DONALD J. QUIGG

*Attesting Officer*     *Commissioner of Patents and Trademarks*